US012565551B2

(12) United States Patent (10) Patent No.: US 12,565,551 B2
Hirose (45) Date of Patent: Mar. 3, 2026

(54) CHLOROPRENE RUBBER COMPOSITION

(71) Applicant: NOK CORPORATION, Tokyo (JP)

(72) Inventor: Shiro Hirose, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 713 days.

(21) Appl. No.: 17/799,445

(22) PCT Filed: Jan. 19, 2021

(86) PCT No.: PCT/JP2021/001637
§ 371 (c)(1),
(2) Date: Aug. 12, 2022

(87) PCT Pub. No.: WO2021/161734
PCT Pub. Date: Aug. 19, 2021

(65) Prior Publication Data
US 2023/0074258 A1 Mar. 9, 2023

(30) Foreign Application Priority Data

Feb. 13, 2020 (JP) .................................. 2020-022433

(51) Int. Cl.
C08K 5/37 (2006.01)
C08F 136/18 (2006.01)
C08K 5/3492 (2006.01)
C08K 5/40 (2006.01)
(52) U.S. Cl.
CPC .......... C08F 136/18 (2013.01); C08K 5/3492 (2013.01); C08K 5/37 (2013.01); C08K 5/40 (2013.01)
(58) Field of Classification Search
CPC ....... C08F 136/18; C08K 5/3492; C08K 5/37; C08K 5/40; C08K 5/378
See application file for complete search history.

(56) References Cited

U.S. PATENT DOCUMENTS

2006/0094831 A1* 5/2006 Choi ........................ C08K 5/40
525/337

FOREIGN PATENT DOCUMENTS

| CN | 103709535 A * | 4/2014 | ............. C08K 3/013 |
|---|---|---|---|
| EP | 2 196 496 | 6/2010 | |
| JP | 2001-279023 | 10/2001 | |
| JP | 2005-200541 | 7/2005 | |
| JP | 2009-001657 A | 1/2009 | |
| JP | 2013-249408 | 12/2013 | |
| JP | 2014-185197 | 10/2014 | |

OTHER PUBLICATIONS

ISR issued in International Patent Application No. PCT/JP2021/001637, Mar. 16, 2021, translation.
IPRP issued in International Patent Application No. PCT/JP2021/001637, Aug. 25, 2022, translation.

* cited by examiner

*Primary Examiner* — Kumar R Bhushan
(74) *Attorney, Agent, or Firm* — GREENBLUM & BERNSTEIN, P.L.C.

(57) ABSTRACT

A chloroprene rubber composition comprising 0.8 to 4 parts by weight of 2,4,6-trimercapto-s-triazine and 0.5 to 4.5 parts by weight of tetrabenzylthiuram disulfide based on 100 parts by weight of chloroprene rubber. The chloroprene rubber composition maintains processability (scorch time) and productivity (crosslinking rate) equivalent to those of conventionally used crosslinking systems, without using substances subject to environmental regulations in crosslinking systems, and at the same time, improves physical properties, such as strength, elongation, and compression set characteristics.

3 Claims, No Drawings

CHLOROPRENE RUBBER COMPOSITION

TECHNICAL FIELD

The present invention relates to a chloroprene rubber composition. More particularly, the present invention relates to a chloroprene rubber composition that can be used as an industrial rubber molding material, such as a seal material or a metal coating material for electric wires or cables.

BACKGROUND ART

Compared with natural rubber, chloroprene rubber is superior in its heat resistance, oil resistance, weather resistance, chemical resistance, ozone resistance, and the like, therefore used for O-rings, grommets, conveyor belts, rolls, and cover boots incorporated into ball joints, etc., and for coating electric wires or cables.

Here, as crosslinking systems compounded in chloroprene rubber compositions, a combination of a thiourea-based crosslinking accelerator, such as ethylene thiourea, with a thiuram-based crosslinking accelerator as a scorch retarder, such as tetramethylthiuram monosulfide or tetramethylthiuram disulfide, is generally used.

However, thiourea (ETU), which is a representative thiourea-based chemical, is registered as a substance of very high concern in REACH. In addition, tetramethylthiuram disulfide is decomposed during crosslinking to generate N-nitrosamine. There is a concern that nitrosamine may affect the human body due to its carcinogenicity. Therefore, it is required to replace such chemicals with other crosslinking systems.

Under such circumstances, Patent Document 1 has proposed a chloroprene rubber composition comprising chloroprene rubber, dialkyl thiourea containing an alkyl group having 3 to 12 carbon atoms, a thiazole-based scorch retarder that does not have a secondary amino group directly bonded to a thiocarbonyl group or a thiol group in the molecule, and a metal oxide. A chloroprene rubber composition obtained from this composition can achieve fast crosslinking without generating nitrosamine and has excellent scorch resistance, and physical properties of the rubber are also regarded as excellent. However, from the viewpoint of high physical properties required for recent rubber materials, further improvement of physical properties is required.

PRIOR ART DOCUMENT

Patent Document

Patent Document 1: JP-A-2014-185197

OUTLINE OF THE INVENTION

Problem to be Solved by the Invention

An object of the present invention is to provide a chloroprene rubber composition that maintains processability (scorch time) and productivity (crosslinking rate) equivalent to those of conventionally used crosslinking systems, without using substances subject to environmental regulations in crosslinking systems, and that, at the same time, has improved in its physical properties, such as strength, elongation, and compression set characteristics.

Means for Solving the Problem

The above object of the present invention can be achieved by a chloroprene rubber composition comprising 0.8 to 4 parts by weight of 2,4,6-trimercapto-s-triazine and 0.5 to 4.5 parts by weight of tetrabenzylthiuram disulfide based on 100 parts by weight of chloroprene rubber.

Effect of the Invention

Since the chloroprene rubber composition according to the present invention does not use any substances subject to environmental regulations in crosslinking systems, no substances that adversely affect the human body, such as N-nitrosamine, which is a carcinogen, are generated during crosslinking of the composition. Further, the chloroprene rubber composition according to the present invention exhibits an excellent effect, making it possible to obtain chloroprene rubber that maintains processability (scorch time) and productivity (crosslinking rate) equivalent to those of conventionally used crosslinking systems, and that has improved in physical properties, such as tensile strength, elongation at break, and compression set characteristics.

Therefore, the chloroprene rubber composition of the present invention can be effectively used as an industrial rubber molding material, such as a seal material or a metal coating material for electric wires or cables.

EMBODIMENTS FOR CARRYING OUT THE INVENTION

Any chloroprene rubber can be used without any particular limitation, as long as it is a synthetic rubber obtained by polymerization of chloroprene. For example, from the viewpoint of scorch resistance and molding processability, chloroprene rubber having a Mooney viscosity $ML_{1+4}$ (100° C.) of 60 to 140 according to JIS K6300-1 (according to ISO 289) or the like is used. Such chloroprene rubber may be one obtained by polymerizing chloroprene according to the conventionally known method; however, commercial products, Skyprene TSR-50, TSR-70 and TSR-54 (produced by Tosoh Corporation), can be used as they are.

2,4,6-Trimercapto-s-triazine and tetrabenzylthiuram disulfide are added as crosslinking agents to chloroprene rubber. Neither of them generates nitrosamine during crosslinking. These are used in such a manner that, based on 100 parts by weight of chloroprene rubber, the amount of 2,4,6-trimercapto-s-triazine is 0.8 to 4 parts by weight, preferably 1 to 3 parts by weight, and the amount of tetrabenzylthiuram disulfide is 0.5 to 4.5 parts by weight, preferably 1 to 4 parts by weight. In both cases, if a crosslinking agent is used less than the specified amounts, the crosslinking rate becomes worse. In contrast, if a crosslinking agent is used more than the specified amounts, the compression set characteristics are deteriorated.

The chloroprene rubber composition of the present invention may contain additives other than the essential components within a range in which the characteristics of the present invention are not impaired. As such additives, those generally used in the rubber industry such as acid acceptors, antioxidants, process oils, plasticizers, processing aids, flame retardants, and fillers are included. These can be used singly or in combination of two or more, if necessary.

As the acid acceptor, a divalent metal oxide or hydroxide is used. For example, magnesium oxide, preferably a combination of magnesium oxide and zinc oxide is used. In addition, hydrotalcite and the like can also be used.

The acid acceptor is used at a ratio of, for example, 5 to 10 parts by weight, preferably 7 to 9 parts by weight, based on 100 parts by weight of chloroprene rubber.

As the antioxidant, a diphenylamine-based antioxidant is preferably used. When a diphenylamine-based antioxidant is used as the antioxidant, excellent heat aging resistance can be imparted without adverse effects on crosslinking characteristics.

Examples of the diphenylamine-based antioxidant include 4,4'-(α,α-dimethylbenzyl)diphenylamine, 4,4'-dioctyldiphenylamine, p-(p-toluenesulfonamide)diphenylamine, styrenated diphenylamine, and the like. Styrenated diphenylamine and the like can also be used.

As the diphenylamine-based antioxidant, commercial products, such as Nocrac ODA-N, Nocrac AD-F, Nocrac CD and Nocrac TD (produced by Ouchi Shinko Chemical Industrial Co., Ltd.), Nonflex OD-3, Nonflex DCO and Stearer LAS (produced by Seiko Chemical Co., Ltd.), and Antage DDA (produced by Kawaguchi Chemical Industry Co., Ltd.), can be used as they are.

One or two or more of the diphenylamine-based antioxidants can be selected for use, and are used at a ratio of 0.5 to 10 parts by weight, preferably 2 to 6 parts by weight, based on 100 parts by weight of chloroprene rubber.

An antioxidant other than the diphenylamine-based antioxidants can also be used. Usable examples include amine-based antioxidants, such as phenyl-1-naphthylamine; phenol-based antioxidants, such as mono(α-methylbenzyl) phenol, 2,6-di-tert-butyl-4-methylphenol and 2,2'-methylenebis(4-methyl-6-tert-butyl)phenol; imidazole-based antioxidants, such as 2-mercaptobenzimidazole and 2-mercaptomethylbenzimidazole; and the like.

Usable examples of the process oil include paraffin-based process oil, naphthene-based process oil, aromatic process oil, and the like.

Usable examples of the plasticizer include phthalic acid-based plasticizers such as dioctyl phthalate, adipic acid-based plasticizers such as dioctyl adipate, sebacic acid-based plasticizers such as dioctyl sebacate, trimellitic acid-based plasticizers such as tris-2-ethylhexyl trimellitate, polymerizable plasticizers such as polyether and polyester, and the like.

Usable examples of the processing aid include higher fatty acids, such as palmitic acid, stearic acid, and oleic acid, or metal salts thereof; fatty acid esters, fatty acid amides, paraffin wax, and the like.

Usable examples of the flame retardant include aluminum hydroxide, magnesium hydroxide, antimony trioxide, and the like.

Usable examples of the filler include inorganic fillers, such as carbon black, calcium carbonate, talc, clay, silica, aluminum oxide and titanium dioxide; organic fillers, such as fluororesin powder; and the like.

Preparation of the composition is performed by kneading components other than crosslinking systems using a kneading machine, such as a single-screw extruder, a twin-screw extruder, a roll, a Banbury mixer, a kneader, or a high shear mixer, and then adding the crosslinking systems, such as a crosslinking agent and a crosslinking aid, followed by kneading. Subsequently, the chloroprene rubber composition is molded into a desired shape using an injection molding machine, a compression molding machine, a heating press machine, an extrusion molding machine, or the like, followed by crosslinking or crosslinking molding, thereby obtaining a crosslinked molded product of chloroprene rubber. The crosslinking thereof is carried out under general crosslinking conditions for chloroprene rubber, for example, at about 150 to 220° C. for about 1 to 30 minutes.

4

EXAMPLES

The following describes the present invention with reference to Examples.

Example 1

Chloroprene rubber (Skyprene TSR-50, 100 parts by weight produced by Tosoh Corporation)

FEF carbon black 60 parts by weight

Magnesium oxide 4 parts by weight

Zinc oxide 5 parts by weight 4,4'-(α,α-dimethylbenzyl)diphenylamine 6 parts by weight (Nocrac CD, produced by Ouchi Shinko Chemical Industrial Co., Ltd.)

Amine-based antioxidant (6 ppd, produced by 6 parts by weight Solutia Europe)

Microcrystalline wax (Suntight R, produced by 2 parts by weight Seiko Chemical Co., Ltd.)

Stearic acid (DTST, produced by Miyoshi Oil & 1 part by weight Fat Co., Ltd.)

Plasticizer (DOS, produced by New Japan Chemical 25 parts by weight Co., Ltd., molecular weight: 426)

2,4,6-Trimercapto-s-triazine 3.0 parts by weight (Nocceler TCA, produced by Ouchi Shinko Chemical Industrial Co., Ltd.)

Tetrabenzylthiuram disulfide 3.0 parts by weight (Nocceler TBZTD, produced by Ouchi Shinko Chemical Industrial Co., Ltd.)

The above compounding components were each kneaded using a kneader to obtain an uncrosslinked compound sample, followed by crosslinking using a compression molding machine at 180° C. for 6 minutes, thereby producing a test sheet with a thickness of 2 mm.

The crosslinking rate and Mooney scorch time were measured using the uncrosslinked compound sample, and the normal state physical properties and compression set were measured using the test sheet.

Crosslinking rate: According to JIS K6300-2 (corresponding to ISO 6502), T10 and T90 values were measured at 180° C. using a rotorless rheometer (produced by Toyo Seiki Kogyo Co., Ltd.).

A T10 value of 60 seconds or less and a T90 value of 420 seconds or less were set as the acceptance criteria.

Mooney scorch time: According to JIS K6300-1 (corresponding to ISO 289), the compound immediately after kneading was preheated at 125° C. for 1 minute, and the time T5 when the viscosity increased 5M above the minimum viscosity at 180° C. was then measured using a Mooney viscometer square groove die and L rotor (produced by Toyo Seiki Kogyo Co., Ltd.).

A time of 8.0 minutes or more was set as the acceptance criterion.

Hardness: According to JIS K6253 (corresponding to ISO 7619), the hardness of a rubber sheet with a thickness of 2 mm was measured using a Type A durometer.

Tensile strength and elongation: According to JIS K6251 (corresponding to ISO 37), measurements were performed for a rubber sheet with a thickness of 2 mm.

A tensile strength of 13.0 MPa or more and an elongation of 300% or more were set as the acceptance criteria.

Compression set: According to JIS K6262 (corresponding to ISO 815), the compression set was measured at 100° C. for 70 hours at 25% compression.
Less than 40% was set as the acceptance criterion.

Example 2

In Example 1, the amount of 2,4,6-trimercapto-s-triazine and the amount of tetrabenzylthiuram disulfide were both changed to 1 part by weight.

Example 3

In Example 1, the amount of 2,4,6-trimercapto-s-triazine was changed to 2 parts by weight, and the amount of tetrabenzylthiuram disulfide was changed to 4 parts by weight, respectively.

Example 4

In Example 1, the amount of 2,4,6-trimercapto-s-triazine was changed to 2.5 parts by weight.

Example 5

In Example 1, the amount of tetrabenzylthiuram disulfide was changed to 2 parts by weight.

Comparative Example 1

In Example 1, the amount of 2,4,6-trimercapto-s-triazine and the amount of tetrabenzylthiuram disulfide were both changed to 0.5 part by weight.

Comparative Example 2

In Example 1, the amount of 2,4,6-trimercapto-s-triazine was changed to 0.5 parts by weight.

Comparative Example 3

In Example 1, the amount of tetrabenzylthiuram disulfide was changed to 5 parts by weight.

6

Comparative Example 4

In Example 1, the amount of 2,4,6-trimercapto-s-triazine was changed to 5 parts by weight.

Comparative Example 5

In Example 1, the amount of 2,4,6-trimercapto-s-triazine was changed to 2 parts by weight, and tetrabenzylthiuram disulfide was not used.

Comparative Example 6

In Example 1, 2,4,6-trimercapto-s-triazine was not used, and the amount of tetrabenzylthiuram disulfide was changed to 2 parts by weight. As a result, crosslinking could not be performed.

Reference Example

In Example 1, 2 parts by weight of thiourea and 3 parts by weight of a crosslinking accelerator (Nocceler TT-P, produced by Ouchi Shinko Chemical Industrial Co., Ltd.) were used as crosslinking systems in place of 2,4,6-trimercapto-s-triazine and tetrabenzylthiuram disulfide.

The results obtained in the above Examples, Comparative Examples and Reference Example are shown in the following Tables 1 and 2.

In Reference Example, the formation of nitrosamine was recognized during crosslinking.

TABLE 1

| Measurement item | Ex. 1 | Ex. 2 | Ex. 3 | Ex. 4 | Ex. 5 |
|---|---|---|---|---|---|
| [Rheometer] | | | | | |
| T10 (second) | 50 | 48 | 54 | 50 | 53 |
| T90 (second) | 257 | 415 | 292 | 271 | 300 |
| Mooney scorch (minute) | 13.4 | 10.5 | 14.2 | 13.1 | 12.0 |
| [Normal state physical properties] | | | | | |
| Hardness (Duro A) | 56 | 56 | 55 | 56 | 58 |
| Tensile strength (Mpa) | 17.1 | 17.3 | 17.4 | 17.4 | 17.5 |
| Elongation at break (%) | 520 | 490 | 560 | 520 | 470 |
| Compression set (%) | 37 | 35 | 37 | 36 | 33 |

TABLE 2

| Measurement item | | Comp. Ex. 1 | Comp. Ex. 2 | Comp. Ex. 3 | Comp. Ex. 4 | Comp. Ex. 5 | Ref. Ex. |
|---|---|---|---|---|---|---|---|
| [Rheometer] | | | | | | | |
| T10 | (second) | 47 | 55 | 59 | 59 | 59 | 49 |
| T90 | (second) | 491 | 496 | 224 | 410 | 407 | 275 |
| Mooney scorch | (minute) | 10.5 | 15.6 | 15.5 | 19.3 | 7.15 | 8.28 |
| [Normal state physical properties] | | | | | | | |
| Hardness | (Duro A) | 54 | 53 | 54 | 52 | 60 | 55 |
| Tensile strength | (Mpa) | 16.6 | 17.0 | 16.4 | 14.1 | 18.2 | 18.7 |
| Elongation at break | (%) | 510 | 580 | 600 | 600 | 400 | 488 |
| Compression set | (%) | 38 | 36 | 46 | 49 | 29 | 39 |

Based on these results, the following can be said.

(1) In each Example, nitrosamine was not generated during crosslinking, and the physical properties of the crosslinked molded product were improved compared with Reference Example.

(2) When either the amount of 2,4,6-trimercapto-s-triazine or the amount of tetrabenzylthiuram disulfide is small, the crosslinking rate is reduced (Comparative Examples 1 and 2).

(3) When either the amount of 2,4,6-trimercapto-s-triazine or the amount of tetrabenzylthiuram disulfide is large, the compression set is deteriorated (Comparative Examples 3 and 4).

(4) When tetrabenzylthiuram disulfide is not used, the scorch time becomes too short (Comparative Example 5). When 2,4,6-trimercapto-s-triazine is not used, the crosslinking reaction itself does not proceed (Comparative Example 6).

The invention claimed is:

1. A chloroprene rubber composition comprising chloroprene rubber, and crosslinking agents consisting of 0.8 to 4 parts by weight of 2,4,6-trimercapto-s-triazine and 0.5 to 4.5 parts by weight of tetrabenzylthiuram disulfide based on 100 parts by weight of the chloroprene rubber;

wherein the entirety of crosslinking agents in the chloroprene rubber composition consists of 2,4,6-trimercapto-s-triazine and tetrabenzylthiuram disulfide.

2. A rubber crosslinked molded product crosslinked and molded from the chloroprene rubber composition according to claim 1.

3. The rubber crosslinked molded product according to claim 2, which is used as a sealing material or a metal coating material.

* * * * *